(12) United States Patent
Murray

(10) Patent No.: US 9,043,608 B2
(45) Date of Patent: May 26, 2015

(54) ELECTRONIC DEVICE PROVIDED WITH CRYPTOGRAPHIC CIRCUIT AND METHOD OF ESTABLISHING THE SAME

(75) Inventor: Bruce Murray, Eastleigh (GB)

(73) Assignee: NXP B.V., Eindhoven (NL)

( * ) Notice: Subject to any disclaimer, the term of this patent is extended or adjusted under 35 U.S.C. 154(b) by 2071 days.

(21) Appl. No.: 10/555,569

(22) PCT Filed: Apr. 28, 2004

(86) PCT No.: PCT/IB2004/001393
§ 371 (c)(1),
(2), (4) Date: Nov. 4, 2005

(87) PCT Pub. No.: WO2004/100440
PCT Pub. Date: Nov. 18, 2004

(65) Prior Publication Data
US 2006/0218414 A1    Sep. 28, 2006

(30) Foreign Application Priority Data
May 7, 2003 (GB) .................................. 0310411.4

(51) Int. Cl.
*G06F 21/00* (2013.01)
*G06F 21/81* (2013.01)
*H04L 9/08* (2006.01)

(52) U.S. Cl.
CPC .............. *G06F 21/81* (2013.01); *H04L 9/0825* (2013.01); *H04L 2209/603* (2013.01); *H04L 2209/80* (2013.01)

(58) Field of Classification Search
USPC .......... 713/184–194, 300, 320, 324, 340, 1, 2
See application file for complete search history.

(56) References Cited

U.S. PATENT DOCUMENTS

| 3,868,631 | A | * | 2/1975 | Morgan et al. ..................... 380/2 |
| 5,533,123 | A | * | 7/1996 | Force et al. .................... 713/189 |
| 6,115,816 | A | * | 9/2000 | Davis ............................ 713/153 |
| 6,151,677 | A | | 11/2000 | Walter et al. |
| 6,748,535 | B1 | * | 6/2004 | Ryan et al. ..................... 713/189 |
| 6,865,690 | B2 | * | 3/2005 | Kocin ............................. 714/14 |
| 2002/0087868 | A1 | | 7/2002 | King et al. |
| 2002/0116342 | A1 | * | 8/2002 | Hirano et al. .................... 705/64 |
| 2003/0021419 | A1 | * | 1/2003 | Hansen et al. ................. 380/277 |
| 2003/0037237 | A1 | * | 2/2003 | Abgrall et al. ................ 713/166 |
| 2004/0109567 | A1 | * | 6/2004 | Yang et al. .................... 380/277 |

FOREIGN PATENT DOCUMENTS

| EP | 0 533 507 | | 3/1993 |
| EP | 0533507 A1 | * | 3/1993 |
| EP | 1 001 641 A2 | | 5/2000 |
| EP | 1 081 891 | | 3/2001 |
| EP | 1081891 A2 | * | 3/2001 |
| JP | 2000-209169 A | | 7/2000 |
| JP | 2001-169359 A | | 6/2001 |
| WO | 00/58963 | | 10/2000 |
| WO | 00/72506 A1 | | 11/2000 |
| WO | 02/060210 A1 | | 8/2002 |

* cited by examiner

*Primary Examiner* — Gilberto Barron, Jr.
*Assistant Examiner* — Simon Kanaan

(57) ABSTRACT

The present invention provides for an electronic device having cryptographic computation means arranged to generate cryptographic data within the device for enhancing security of communications therewith, the device including an onboard power supplying means arranged to provide for the driving of the said cryptographic computational means, and so as to provide a device by way of a manufacturing phase and a post manufacturing phase arranged for distribution and/or marketing of the device, and wherein the step of generating the cryptographic data occurs during the post manufacturing phase.

20 Claims, 1 Drawing Sheet

Figure 1:
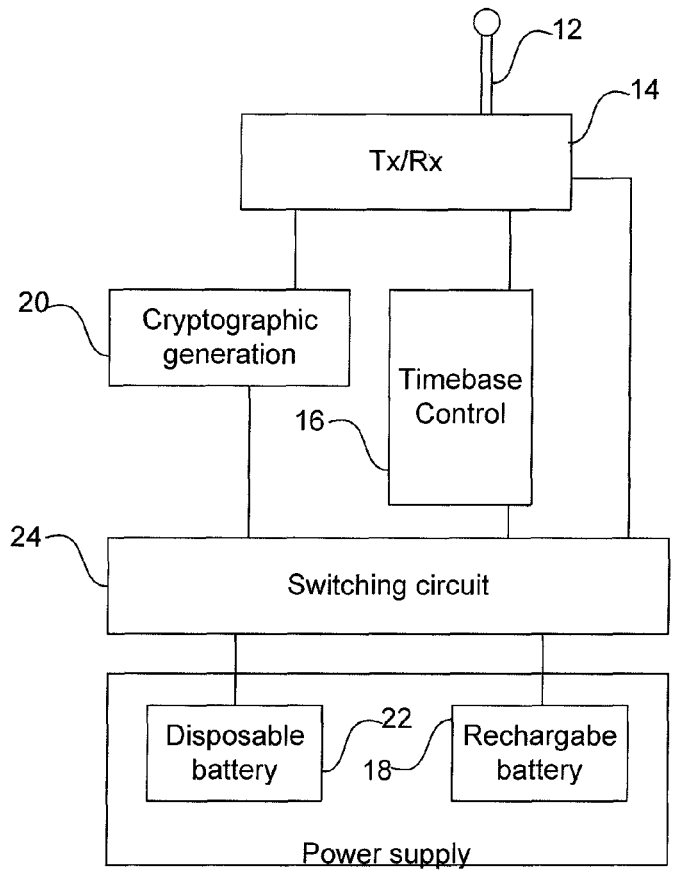

ELECTRONIC DEVICE PROVIDED WITH CRYPTOGRAPHIC CIRCUIT AND METHOD OF ESTABLISHING THE SAME

The present invention relates to an electronic device arranged to exhibit cryptographic security features and to a related method of establishing the same.

In the recent past, an increase in the desire to protect not only the content of communications traffic between entities but also to ensure the correct targeting and retrieval of such information has increased adoption of security features, and in particular such features based on public key cryptography within consumer electronic devices. A common form of such a security arrangement comprise public key cryptographic techniques which allow for an electronic device to prove its identity, and to agree session keys, so as to participate in a secure communication over a particular network thereby allowing secure protection of the content being transmitted from, or received by, the device.

As noted above, in addition to providing protection for the actual content being transmitted, similar approaches to security can be employed in order securely to associate such content with individual devices so as to support "digital rights management" arrangements in which, for example, an audio file can be retrieved and played only on a device belonging to the legitimate purchaser of said file.

A common feature of such a system employing cryptographic techniques is the need to provide the device with a securely embedded public/private key pair. As is known, the private key is generally used to apply a digital signature to outgoing messages, or to decrypt targeted incoming messages or other communication content.

The so-called public key is arranged to be provided to third parties to allow for verification of messages signed by the device, and to allow for the encryption of messages targeted at the device.

In this scenario, there is a significant amount of trust that must be placed with the public key and this is normally achieved by requiring that the public key is digitally signed by an appropriate certification authority. The resulting combination of the public key and signature as provided by the certification authority then forms a device certificate. Such authenticating certificate is readily verifiable by any third party that has been provided with the appropriate public key of the certification authority.

For devices employing a public key arrangement, the device certificate is generally installed within the device at the time of its manufacture and in accordance with either of the two following arrangements.

First, the certification authority creates a public/private keypair, and the certificate associated with the device, on a dedicated computer system, and the appropriate information can then be programmed into the device at a late stage in its manufacture and so prior to its distribution into the relevant market.

As an alternative, the device itself can be arranged to create its own public/private keypair by internal processing during its manufacturing phase, and then subsequently to emit the public key for signing by the certification authority so as to create the device certificate. The device certificate is then again installed in the device at a late stage in its manufacture.

The latter of the two arrangements noted above in which the device creates its own public/private keypair by internal processing offers advantages since a higher level of security can be achieved. As will be appreciated, since the private key of the device can be arranged to be created wholly within the secured hardware domain of the device, it need never be exposed and, as noted, it is only the public key that need be emitted for signature by the certification authority.

However, in arriving at such an advantageously higher degree of security, disadvantages have been identified in that the internal processing required adds significantly to the device serialisation time arising during the manufacturing stage. Also, the internal processing that generates the public/private keypair, particularly in situations in which the RSA public key system is employed, can take in the region of many tens of seconds, or even minutes, especially if the particular device has constrained computational ability in view of it being designed for low power consumption, for example a portable communications device. Potentially problematic delays are then experienced during device production.

Yet further, it is envisaged that many future devices will be arranged to operate within relatively small authorised domains, for example within a particular household, in which the device can associate itself with other devices in close physical proximity during its initial period of use. There is a realization that members of such domains may subsequently become separated geographically, and so require secure communication over public networks.

Within such authorised domains these devices are arranged to operate on a so-called "web-of-trust" principle in which trusted links are allowed only with other devices belonging to that same domain. One commonly known arrangement employing the "web-of-trust" concept is the operating mode of security software known as "PGP".

Within such a "web-of-trust" arrangement, the devices no longer have to employ a hierarchical public key infrastructure, since they need only to have been provided with identifiers and a key pair before the first point of usage within the domain. The generation of a keypair however therefore remains an important consideration even in such arrangements which do not use a classic hierarchical public key infrastructure.

The present invention seeks to provide for an electronic device offering cryptographic security, and a method of establishing the same, and which have advantages over known such systems in which the cryptographic data is to be generated internally within the device.

According to a first aspect of the present invention there is provided an electronic device having cryptographic computation means arranged to generate cryptographic data within the device for enhancing security of communications therewith, the device including an onboard power supplying means arranged to provide for the driving of the said cryptographic computational means.

Through employing an onboard power supplying means, the cryptographic computational means can be arranged advantageously to generate the cryptographic data subsequent to the manufacturing of the device and, in particular, during the phases when the manufactured device might otherwise be laying dormant, i.e. prior to, during and just after packaging, and during transportation and shipment for eventual retail. Employment of an onboard power supply so as to allow for the post-production generation of the cryptographic data therefore advantageously reduces production costs and delays by removing the serialisation step from the manufacturing phase of the device.

Also, since relatively long periods may be available for such processing by the cryptographic computational means so as to generate the cryptographic data, a relatively high standard of security can therefore be achieved.

It will be appreciated that the invention therefore provides, in addition to the technical advantages as compared with the prior-art requirements for serialisation during production, additional advantages in that the cryptographic data and the related serialisation can be selectively initiated only in relation to device that have a higher probability of actually being sold and this can vastly reduce processing steps that might otherwise be wasted on eventually unsold devices.

The features of Claims 2-5 relate to particularly advantageous arrangements in which the power supplying means can be selectively activated as required and can also form part of the principal power supplying means arranged for future normal operation of the device so as to advantageously reduce potential duplication of power supplements within the device.

The features of Claims 6 and 7 are advantageous in ensuring that the maximum advantages can be achieved by the present invention whilst minimising disruption to the manufacturing-retail cycle.

According to another aspect of the present invention there is provided a method of establishing cryptographic data within an electronic device, and comprising the steps of generating cryptographic data within the device for enhancing security of communications therewith, and under power provided by means of an onboard power supplying means.

The feature of Claim 13 is particularly advantageous in allowing for control of the commencement of the internal generation of the cryptographic data and in relationship with the packaging and/or transportation of the device.

According to yet another aspect of the present invention, there is provided a method of providing a device with cryptographic data and including a manufacturing phase and a post manufacturing phase arranged for distribution and/or marketing of the device, and including the step of generating the cryptographic data during the post-manufacturing phase.

The feature of Claim 19 is particularly advantageous in allowing for authentication of a public key subsequent to packaging of the device.

Figure 2:
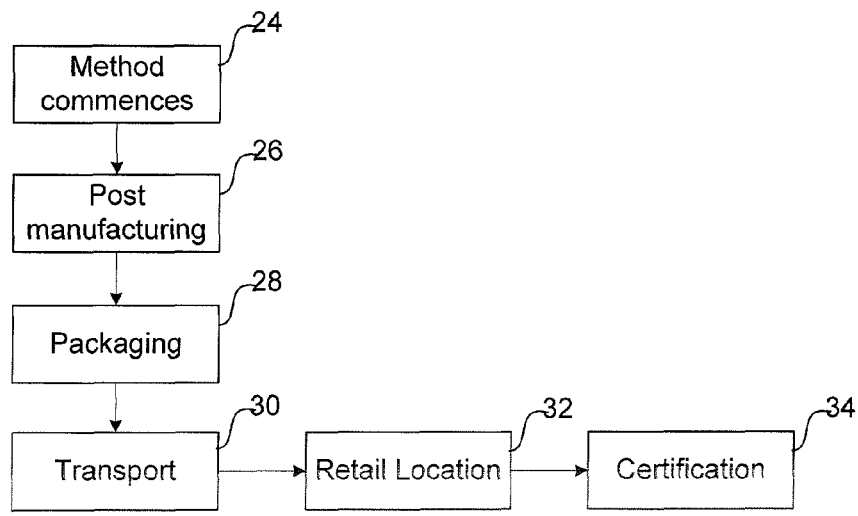

The invention is described further hereinafter, by way of example only, with reference to the accompanying drawings in which:

FIG. 1 is a schematic block diagram of an electronic device embodying the present invention; and FIG. 2 is a flow diagram illustrating operation of a device such as that in FIG. 1 in accordance with an embodiment of the present invention.

Turning now to FIG. 1, there is illustrated an electronic device in the form of a mobile phone 10 which, in accordance with its normal mode of operation, is required to transmit and receive secure communication signals by way of its antenna 12.

The mobile phone 10 includes standard electronic circuitry and which is not illustrated in detail in the drawing with the exception of a transmitting/receiving section 14, timebase control section 16 and a rechargeable battery 18 for powering normal use of the phone.

In addition, the mobile phone 10 includes a cryptographic generation section 20 arranged for generating public/private keypairs as part of a public key cryptographic arrangement and which, in accordance with the illustrated embodiment of the present invention, is arranged to be powered for such operation by means of a disposal battery 22 which can be readily inserted in, and removed from, the mobile phone 10.

Such insertion of the disposable battery 22 is arranged to initiate operation of the cryptographic generation section 20 as required. However, as an alternative, switch means can be included 24 so as to allow for the selected initiation of the cryptographic generation section 20 by means of the disposable battery 22.

The mobile phone 10 as illustrated has been designed from the recognition that, with regard to such devices, the time spent by the product during its packaging, distribution and retailing phases can usefully be employed for cryptographic computation measures so that such measures are then removed from, and therefore simplify and expedite, the manufacturing phase.

Thus, the device 10 can be manufactured and, as illustrated, fitted with a disposable battery 22 and then steps taken to initiate the cryptographic computation within the cryptographic generation section 20 shortly prior to packaging and distribution and without any external device serialisation for cryptographic purposes.

As an alternative, the disposable battery 22 can be omitted and predetermined amount of charge provided to the rechargeable battery 18 of the mobile phone 10, which predetermined amount of charge is sufficient to drive the cryptographic computation within the section 20 during the device's post-production phase. Production costs and related delays are therefore advantageously removed by means of the aforementioned serialisation steps.

Dependent upon the marketing/transport route taken by the device, days, or even possibly weeks, will be available for the product to perform its own keypair generation internally within the cryptographic generation section 20. The product design and key generation algorithms are of course advantageously selected so as to ensure that such cryptographic computation processors will be completed by the time the product is made available to the end customer.

An associated advantage arises here in that, in allowing for relatively long processing periods, i.e. at least days instead of minutes as currently available, the cryptographic processes can be performed to a higher standard of security than would be economically viable were such processes to be executed during the latter stages of the production phase as currently occurs.

Yet further, it becomes advantageously possible to control the frequency of operation of the processing elements of the cryptographic generation section 20 so as to ensure only low power consumption, and thus low heat dissipation and radiation etc. once the product has been packaged and during its transit to, for example, its retail location.

Turning now to FIG. 2, there is provided a block flow diagram illustrating a method according to an embodiment of the present invention.

The method commences at a block 24 with the actual manufacture of the device, for example a mobile telephone 10 of FIG. 1, and then proceeds into a post-manufacturing phase at block 26 at which the cryptographic computation is activated by means of the disposable battery 22 so as to generate internally within the device, a public/private keypair at block 26.

Subsequent to initiation of the cryptographic processing, and while such processing is ongoing, the device is packaged at block 28 and subsequently transported at block 30 to its retail location identified by block 32.

In accordance with the embodiment illustrated by reference to FIG. 2, the mobile phone 10 exhibits a requirement for operation that requires its public key to be signed into a digital certificate by a certification authority and this is illustrated at block 34. This step in the process can be provided at the point of sale of the mobile phone 10.

Such a feature serves to illustrate a particular further advantage of the present invention in that, in addition to the technical advantages arising as compared with the serialisation as currently occurring during production and as noted above, commercial and economic advantages arise in that the serialisation now occurring in accordance with the present invention need only occur shortly prior to the actual sale of the device. This ensures that device serialisation effort is not then wasted on unsold devices.

In accordance with another embodiment of the present invention, if the product concerned is to be used wholly with an authorized domain, it can then be arranged to conduct whatever "web-of-trust" associations are needed during its initial period of operation shortly after retailing, for example after being unpacked by the end customer. In this scenario, the certification block 34 illustrated in FIG. 2 is replaced by a mere "initial use" block.

As will therefore be appreciated from the above, the present invention is advantageous in reducing production costs and production times, of portable devices by removing the need to conduct cryptographic serialisation at a late stage in the production phase of the device. The time spent by the product in its distribution and retailing phases is advantageously utilised by allowing the device to perform internal cryptographic keypair generation whilst packaged.

As discussed above, the device can then be put into service immediately by an end customer subsequent to purchase if it is to be used in a "web-of-trust" authorised domain. However, if operation device requires a digital certificate issued by a digital certification authority, then the certificate can be create and installed in the device at the point of sale.

The invention is not restricted to the details of the foregoing embodiments. For example, it should be appreciated that the device and method of the present invention can be incorporated within any appropriate device, and in particular a mobile device requiring security of communication and/or connectivity.

Also, reference to communication is not restricted to electronic communication. For example, one might have a portable disc player device that generates its own keypair according to the invention, has its public key read and registered at a trustworthy point of sale such that no certificate is created or installed. The user can then receives packaged media, such as CD-R discs, through the postal system or other physical form of transport and delivery.

The invention claimed is:

1. An electronic device having:
    a cryptographic computation circuit configured to generate cryptographic data, that includes a key pair with both a public key and a private key, within the electronic device for enhancing security of communications therewith;
    an onboard power supply circuit; and
    a power control circuit coupled to the onboard power supply circuit and configured to selectably provide a first electrical connection between the power supply circuit and the cryptographic circuit and, independent of the first electrical connection, selectably provide one or more additional electrical connections between the power supply circuit and other circuits of the electronic device, the power control circuit configured to inhibit power to the other circuits until the generation of the cryptographic data is complete.

2. The electronic device as claimed in claim 1, wherein the power control circuit is configured to disable power to the cryptographic circuit while the onboard power supply circuit powers other circuits in the electronic device.

3. The electronic device as claimed in claim 1, wherein the onboard power supply circuit comprises a battery.

4. The electronic device as claimed in claim 1, wherein the onboard power supply circuit comprises a disposable temporary power supply circuit.

5. The electronic device as claimed in claim 1, wherein the onboard power supply circuit comprises an at least part charge rechargeable power supply circuit.

6. The electronic device as claimed in claim 1, wherein the cryptographic computation circuit is arranged to generate the key pair in response to an application of power from said onboard power supply.

7. The electronic device as claimed in claim 6, wherein the power control circuit is configured to power the cryptographic computation circuit during transportation of the electronic device.

8. The electronic device as claimed in claim 1, further including a wireless transmitting/receiving section and a timebase control section, wherein the electronic device is configured to operate the cryptographic computation circuit at a frequency of operation that uses more than a day to generate the key pair, thereby controlling power consumption and heat dissipation.

9. The electronic device as claimed in claim 8, wherein the cryptographic computation circuit is arranged to generate a public/private key pair that is compatible with RSA.

10. The electronic device as claimed in claim 9 and arranged such that the public key can be made available for certification purposes.

11. The electronic device as claimed in claim 1, wherein the cryptographic computation circuit is configured to generate the key pair in response to an initial user start-up cycle for operation within an authorized domain, based upon devices in communication with the electronic device during a specified time period for initial startup.

12. A method of establishing cryptographic data within a mobile device comprising the steps of:
    in an integrated circuit of the mobile device having an onboard power supply and a cryptographic circuit selectively coupling power from the power supply to the cryptographic circuit to activate the cryptographic circuit, and
    in response to activating the cryptographic circuit, generating cryptographic data with the cryptographic circuit, the cryptographic data including a key pair with both a public key and a private key, and configuring the mobile device to complete the generating of the cryptographic data prior to operating the device in a normal mode of operation in which a transceiver circuit of the mobile device is operated.

13. The method as claimed in claim 12, wherein the selectively coupling power from the power supply to the cryptographic circuit to activate the cryptographic circuit is initiated by an internal circuit configured to activate the cryptographic circuit independently from any external user input.

14. The method as claimed in claim 12, wherein the step of generating the cryptographic data including cryptographic key information is implemented at a low frequency of operation whereby the generation of the cryptographic data spans a time period of more than a day.

15. The method as claimed in claim 14, wherein the cryptographic key information is a public/private key pair that is compatible with RSA.

16. The method as claimed in claim 15, further including making the public key available for certification purposes.

17. The method as claimed in claim 12 and in which the steps are automatically taken within an internal circuit of the mobile device, by operating a controller circuit configured during a manufacturing phase of the mobile device, during a post manufacturing phase of the mobile device after enclosure of the internal circuit within the mobile device.

18. A method of providing a device with cryptographic data, the method comprising:

placing the device in a low-power mode in which an onboard power supply circuit of the device only powers a cryptographic circuit of the device;

generating the cryptographic data, with the cryptographic circuit, the cryptographic data including a key pair with both a public key and a private key; and in response to the generation of the cryptographic data, electrically disabling power to the cryptographic circuit during operation of other circuits in the device.

19. The method as claimed in claim 18, further including the a step of creating a device certificate of the device subsequent to packaging of the device.

20. The method as claimed in claim 19, further including creating the device certificate in response to an external command indicative of a point of sale of the device.

\* \* \* \* \*